Jan. 1, 1935. E. MAHLE 1,986,480
PISTON
Filed Nov. 14, 1931
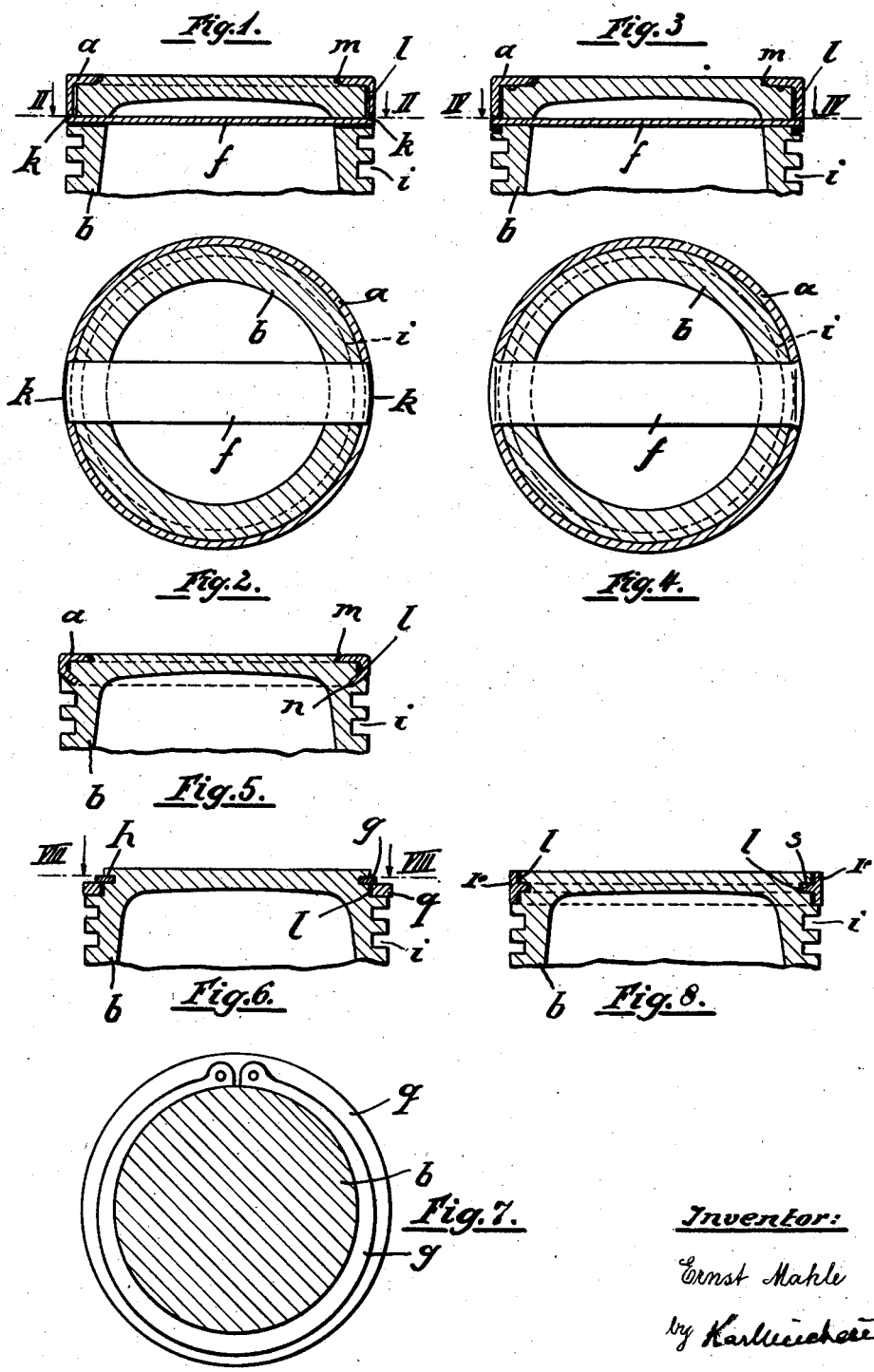

Patented Jan. 1, 1935

1,986,480

UNITED STATES PATENT OFFICE 1,986,480

PISTON

Ernst Mahle, Stuttgart, Germany

Application November 14, 1931, Serial No. 574,973
In Germany November 17, 1930

7 Claims. (Cl. 309—14)

My invention relates to internal combustion engines and more especially to the pistons forming part of such engines. It is an object of my invention to eliminate difficulties resulting from the necessity of providing considerable clearance between the piston skirt and the cylinder wall, particularly in the region of the packing rings and the piston head.

To this end I provide a guard ring of a material having a low heat-expansion coefficient between the end face of the piston head and the first packing ring.

The comparatively large clearance at the piston head causes excessive stress in the piston rings, and particularly in the first ring on which the combustion gases impinge directly so that it is heated excessively, which is not only unfavourable for the rings, and particularly for the first ring, but also for the material at the grooves so that the fit in the grooves is rapidly deteriorated. This is particularly serious in pistons of light metal or light alloys, but gray cast iron is also attacked, though to a somewhat lesser extent. The rings become leaky and gases of combustion escape into the crank case.

Lubricating conditions become difficult on account of the high pressure of the gases the influence of which extends as far as the second and even the third ring, and the oil is coked by the excessive temperatures. The coke acts as an abrasive on the cylinder wall and increases the wear. The large clearance between the piston head and the cylinder wall favours the settling of the coke at the piston head where it combines with the comparatively soft material of the piston and acts like emery on the cylinder or liner.

These drawbacks are eliminated by my invention in which the inevitable clearance between the piston and the cylinder is reduced to a minimum by providing the aforesaid guard ring of material with a low heat-expansion coefficient at the piston head. By these means the clearance at the piston head becomes equal to, or smaller than, the clearance at the piston skirt, without, however, interfering with the flow of heat to the cylinder walls through the piston head and the rings.

It has already been suggested to secure protecting plates on the piston head but this has the drawback that the heat flow is interfered with since the protecting plate is of a metal the conductivity of which is less than that of a piston of light metal or light alloy. By providing a guard ring according to the present invention instead of a plate the major portion of the piston head is exposed so that the heat transfer is not interfered with.

What is aimed at is that the heat expansion of the cylinder under operating conditions as calculated from the heat expansion coefficient of the cylinder material, multiplied with its diameter and the temperature of the cylinder, should be equal to the heat expansion of the piston at the piston head under the same conditions, as calculated from the heat-expansion coefficient of the material of the guard ring, multiplied with the diameter and the temperature of the piston at the head. That is, the coefficients of thermal expansion of the cylinder and of the guard ring are in a substantially inverse ratio to the working temperature ranges of the cylinder wall and of the piston head, respectively.

By these means the heat expansion of the cylinder and the piston at the head become equal in cold and hot condition, and the desired effect may be obtained within very narrow limits by properly selecting the material of the guard ring.

The clearance between the guard ring and the wall of the cylinder may be very small and therefore the gases of combustion which, without the guard ring, would strike at full force the first piston ring, are throttled to a very considerable extent. For instance, in a normal vehicle engine the first piston ring is heated to about 1400° C. and subjected to a pressure of about 30 kilograms per square centimetre. By the guard ring it is relieved of the major portion of the pressure and the stress on all rings is reduced so that fewer rings are required. It has been found that leakage of combustion gases into the crank case is prevented by the guard ring notwithstanding a reduction of the number of piston rings to less than 10%.

In the drawing affixed to this specification and forming part thereof various types of guard rings embodying my invention are illustrated diagrammatically by way of example.

In the drawing:

Fig. 1 is an axial section of a piston head having a guard ring of angular section with a cross bar for holding it welded thereto, Fig. 2 is a section on the line II—II in Fig. 1, Fig. 3 is an axial section of a cylinder head having the guard ring illustrated in Figs. 1 and 2 but with the cross bar held in the ring by upsetting, Fig. 4 is a section on the line IV—IV in Fig. 3, Fig. 5 is an axial section of a piston head having a guard ring of angular section with one of its flanges engaging in the piston skirt, Fig. 6 is an axial section of a piston head having a guard ring of rectangular section with a split ring for holding it on the piston head, and Fig. 7 is a plan view of Fig. 6, and Fig. 8 is an axial section of a piston head having a guard ring of T-section.

In all figures, b is the piston head and l are the usual grooves for the reception of the piston packing rings (not shown) in the skirt of the piston. The piston b may be of normal type and of any suitable material, such as light metal or alloy, gray cast iron, or the like.

Referring now particularly to Figs. 1 and 2, a is the guard ring which is here shown with angular cross-section and is made of a material having a low heat-expansion coefficient which preferably is substantially less than the coefficient of the piston material. I have found certain well known nickel steel alloys having a very low heat expansion coefficient to be particularly suited for this purpose. f is a cross bar of the same material as the guard ring a which is inserted in the piston below the inner end of the guard ring a and welded to its inner flange at k. The step in the piston head for the reception of that flange of the guard ring which extends in parallel to the axis of the cylinder, is of such size that a clearance l is formed between the parallel flange and the cylinder head, which is so large that the heat expansion of the piston head will not interfere with the guard ring. An equal clearance m is provided for the edge of the other flange of the guard ring which extends transversely to the axis of the cylinder.

Referring now to Figs. 3 and 4, the guard ring and the cross bar f are arranged as described but the ends of the cross bar are inserted in slots of the parallel flange of the ring and held by upsetting.

Referring now to Fig. 5, the parallel flange of the guard ring a is beaded over inwardly at n and engages in a groove of the piston head.

The ring shown in Fig. 5 may be cast on the piston head and the clearances at l and m will form by the shrinking of the ring material after solidification.

Referring now to Figs. 6 and 7, q is a flat ring which is placed on the turned-down outer end of the piston head and held by a split ring g in a groove h of the piston head.

Referring now to Fig. 8, r is a guard ring of T-section with its web s projecting into a groove in the piston head. The ring is split, placed on the piston head with its flange s engaging in the groove, and its ends are connected, for instance, by welding. A guard ring of T-section has the advantage that the face with which the ring slides on the cylinder or liner is comparatively large and the guiding face of the ring in the piston may be made as strong as desired as the ring is readily secured even in this case.

I wish it to be understood that I do not desire to be limited to the exact details of construction shown and described for obvious modifications will occur to a person skilled in the art.

I claim:—

1. In an internal combustion engine in combination, a cylinder, a piston, a guard ring encircling the piston in close proximity to the piston head, said ring consisting of a material having a heat-expansion at the high operating temperature of said piston which is substantially equal to the heat-expansion of said cylinder at the relatively low operating temperature of said cylinder and a cross bar extending across said piston with its ends fixed to said guard ring.

2. In an internal combustion engine, a piston, a guard ring encircling said piston in close proximity to the piston head and a cross bar extending through said piston with its ends fixed to said guard ring.

3. In an internal combustion engine, a cylinder, a piston operating in said cylinder carrying the usual piston rings, an undivided guard ring cast around the skirt of said piston above said rings and extending at least to the face of the said piston, said guard ring being constructed of a heat resistant material and fitting said cylinder with a minimal clearance thereby screening combustion gases from the piston rings and crank case; the coefficients of thermal expansion of said cylinder and of said guard ring being in a ratio substantially inversely as the working temperature ranges of the cylinder wall and of the piston, respectively, thereby producing a substantially constant clearance between these parts.

4. The construction of claim 3 wherein the guard ring is provided with a flange extending into the body of the piston.

5. The construction of claim 3 wherein the piston is of light metal having a coefficient of expansion greater than that of said cylinder.

6. The construction of claim 3 wherein the said guard ring is of nickel steel alloy.

7. The construction of claim 3 wherein the said guard ring is of angular section and covers the angle between the piston face and the skirt.

ERNST MAHLE.